United States Patent [19]

Peter et al.

[11] Patent Number: 5,592,067
[45] Date of Patent: Jan. 7, 1997

[54] DISTRIBUTED MULTI-MODULE BATTERY EQUALIZATION

[75] Inventors: David A. Peter, Anderson; John L. Ayres, Cicero, both of Ind.

[73] Assignee: General Motors Corporation, Detroit, Mich.

[21] Appl. No.: 376,631

[22] Filed: Jan. 23, 1995

Related U.S. Application Data

[63] Continuation of Ser. No. 178,170, Jan. 6, 1994, abandoned.

[51] Int. Cl.$^6$ .................................................. H01M 10/46
[52] U.S. Cl. ...................................... 320/15; 320/39
[58] Field of Search ............................ 320/15, 16, 17, 320/18, 39, 6; 363/67, 69, 70

[56] References Cited

U.S. PATENT DOCUMENTS

| | | | |
|---|---|---|---|
| 3,623,139 | 11/1971 | Dickerson | 320/17 X |
| 4,079,303 | 3/1975 | Cox | 320/17 |
| 4,238,721 | 12/1980 | DeLuca et al. | 320/18 |
| 4,303,877 | 12/1981 | Meinhold | 320/18 X |
| 4,614,905 | 9/1986 | Petersson et al. | 320/18 |
| 4,713,597 | 12/1987 | Altmejd | 320/18 X |
| 4,743,830 | 5/1988 | Lakey | 320/6 |
| 5,003,244 | 3/1991 | Davis, Jr. | 320/17 |
| 5,063,340 | 11/1991 | Kalenowsky | 320/18 X |
| 5,177,425 | 1/1993 | Goto | 320/6 |

FOREIGN PATENT DOCUMENTS

| | | |
|---|---|---|
| 3940929 | 5/1991 | Germany . |
| 432639 | 6/1991 | Germany . |
| WO9500978 | 1/1995 | WIPO . |

OTHER PUBLICATIONS

Hopkins, D. C.; "The Use of Equalizing Converters for Serial Charging of Long Battery Strings"; Jun. 1991; IEEE. IEEE Transactions on Industry Applications, vol. 29, No. 2, Apr. 1993.
D. Hopkins et al. "Dynamic Equalization During Charging of Serial Energy Storage Elements", pp. 363–367.

*Primary Examiner*—Edward H. Tso
*Attorney, Agent, or Firm*—Vincent A. Cichosz

[57] ABSTRACT

An apparatus and method are disclosed for equalizing individual module voltages in a multiple module battery pack during recharging. Two individual module voltages are compared, and charge redistribution is caused to occur by way of switched mode converters when the voltages are not equivalent. Switched mode converters may be of unidirectional or bidirectional topologies.

7 Claims, 5 Drawing Sheets

DISTRIBUTED MULTI-MODULE BATTERY EQUALIZATION

This is a continuation of application Ser. No. 08/178,170 filed on 6 Jan. 1994, now abandoned.

BACKGROUND OF THE INVENTION

This invention is directed toward a charging system for electrochemical batteries. More particularly, the invention solves certain problems associated with charging a multiple module series arrangement of individual constituent batteries or cells making up an aggregate battery pack.

Motor vehicles driven by electric motors typically require voltages of significantly greater magnitude than those commonly utilized in conventional internal combustion engine driven motor vehicles for powering accessories. A battery pack made up of at least one series arrangement—and potentially multiple parallel connected series arrangements—of individual modules is one common way for achieving a high voltage in a manageable form. Physical characteristics from module to another are never identical even when modules are produced under the tightest control. This becomes an extremely important consideration in a series arrangement of modules wherein the discharge and charge current is identical through each module. During discharge or re-charge cycling of a series battery pack, one or another of the individual modules reaches—prior to the remaining modules reaching—certain physical discharge or re-charge limitations after which damage may occur.

For example, in conventional lead acid aqueous electrolyte batteries, discharge beyond a certain point may lead to reversal of the electrodes and permanent damage to the module. Re-charge beyond a certain point may lead to gassing of the electrolyte thereby reducing the useful life of the module. Additionally, the module reaching a fully charged state prior to the others will thereby limit the charge of the remaining modules where charging is terminated in response thereto. This "weak link" in the series chain of modules will thereby promote the situation wherein the only fully charged module is the one to first reach that state, resulting in a battery pack which never reaches its full energy capacity.

SUMMARY OF THE INVENTION

It is one object of the present invention to reduce or eliminate the influence that any one module has upon the remaining modules during re-charge of a series arrangement of individual modules.

Another object of the invention is to equalize the charge to all modules during re-charge such that each module reaches full capacity without detrimental overcharge to any module.

Yet another object of the invention is to provide a system for accomplishing the foregoing objectives without microprocessor or other centralized control.

Therefore, in accordance with one aspect of the present invention, a charge equalization apparatus is provided utilizing a plurality of switched mode power converter means, each effective between a pair of modules for equalizing the voltage therebetween. Each power converter is effective to pump charge from the one of the pair of modules having a higher voltage to the other of the pair having the lower voltage.

2

According to another aspect of the invention, each of the converter means is effective to pump charge either bidirectionally or unidirectionally between the pair of modules.

DETAILED DESCRIPTION OF THE DRAWINGS

Figure 1A:
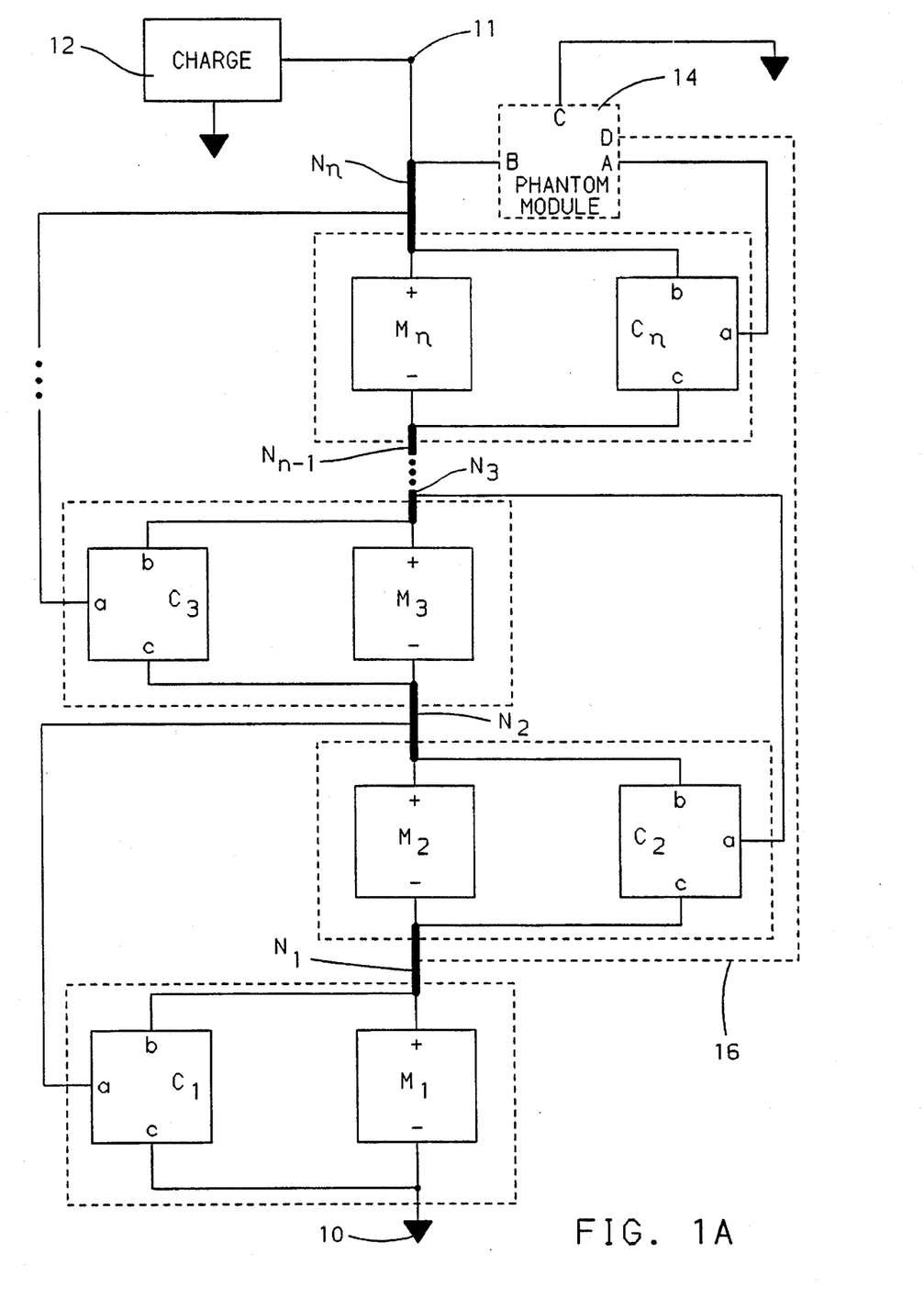
FIG. 1A is a block diagram illustrating a distributed charge equalization apparatus utilizing unidirectional boost converter topology in accordance with the present invention.

FIG. 1 is illustrative of a first preferred embodiment which utilizes unidirectional boost topology to carry out the present invention. A plurality (n) of modules having substantially equivalent terminal voltage ratings, each individually designated M, are further identified by a numerical subscript indicating their series positional relationship in an aggregate multi-module pack. The pack comprises at least the illustrated series coupled modules $M_1$ through $M_n$ between aggregate pack ground terminal 10 and aggregate pack voltage terminal 11. The module coupled directly to aggregate pack ground 10 is identified with the subscript "1" as $M_1$, and the module coupled directly to aggregate pack voltage terminal 11 is identified with the subscript "n" as $M_n$. Relative positions of modules when discussed hereafter will be identified with the subscript "x" and numerical progressions therefrom (i.e. $M_1$, $M_2$ ... $M_{x-1}$, $M_x$, $M_{x+1}$ .. . $M_{n-1}$, $M_n$).

The aggregate pack ground throughout all figures is identified by a solid schematic ground symbol as illustrated in FIG. 1. Each module $M_x$ has a positive and negative terminal, marked (+) and (−) respectively, in accordance with battery terminal convention and a respective module voltage thereacross ($VM_x$). Pack nodes $N_1$ through $N_n$ are called out with the same subscript scheme used to identify the modules, each pack node $N_x$ being associated with the positive terminal of module $M_x$. Nodes are exaggerated for clarity as heavy dark lines in the illustrations. Each module $M_x$ therefore has associated therewith a pack node voltage ($VN_x$) which is defined as the voltage at the respective pack node ($N_x$) associated with the positive terminal of the corresponding module ($M_x$) with respect to the aggregate pack ground. The aggregate pack voltage is defined as the voltage between aggregate pack voltage terminal 11 and aggregate pack ground 10 and may hereafter be referred to as VP.

Charge source 12 is shown coupled between aggregate pack voltage terminal 11 and aggregate pack ground 10 for supplying DC charge current to the pack. Specific details of charge source 12 are not discussed herein, it being sufficient to note that the charge source need only provide a DC charge current. It is preferable, of course, that charge source 12 is appropriately either voltage or current controlled to prevent overcharging of the entire pack. Indeed, as part of an overall charging system it is desirable that charge source 12 is controlled to maximize charge efficiency, maximize pack and module life and minimize charge time.

Figure 1B:
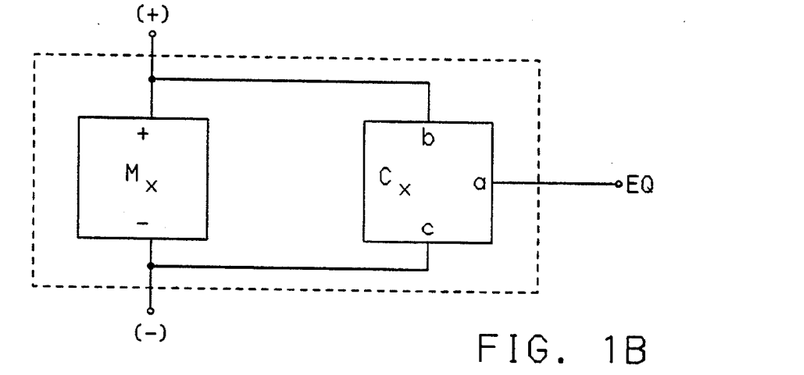
FIG. 1B illustrates a preferred unitary grouping of a unidirectional boost converter with a module in accordance with the present invention.

In the present exemplary unidirectional boost topology embodiment of FIG. 1, each module has associated therewith a corresponding converter means, preferably autonomously self-controlled. Each of the converter means is individually designated with an upper case C and further identified by a subscript identical to the subscript of the module to which it corresponds for purposes of this description. Each converter means is interactively coupled with a pair of modules but is demonstratively grouped with one of the pair herein for reasons which will be more fully developed. Each illustrated dashed-line box enclosing a module and corresponding converter means comprises an integral three lead unit. FIG. 1B illustrates one such unit standing alone with the three leads being identified as (+), (−) and EQ. The (+) lead is equivalent to a conventional module positive terminal, and the (−) lead is equivalent to a conventional module negative terminal. The EQ lead is a charge pump lead which redistributes charge current from a pack node $N_x$ associated with a module $M_x$ to the adjacent module pack node $N_{x+1}$ associated with the module $M_{x+1}$ having the next higher pack node voltage.

It is noted that with the described grouping of a module and a converter means charge equalization is accomplished without the necessity of a cumbersome common charge bus and more complicated converter topologies. Similarly, independent operation of each converter means distributes equalization control thereby alleviating the necessity of centralized control; although centralized control where desirable may be implemented but is not discussed herein as it is beyond the scope of the present invention. Distributed equalization allows a virtually unlimited number of series modules to be integrated into a desired pack. As can be seen from FIG. 1A, a relatively simple and substantially repetitive coupling configuration allows for such desirable attributes. The grouping of a module together with a converter means into a stand alone unit as shown in FIG. 1B and earlier described with reference thereto affords the designer a great deal of system flexibility and simplification.

In operation, any given converter means senses inequality of respective voltages of a pair of modules. In the present unidirectional embodiment, the pair of modules comprises two series adjacent modules although any two modules in a pack may comprise a pair provided appropriate isolation circuitry is provided. An inequality wherein the module ($M_x$) with the lesser pack node voltage has a module voltage which exceeds the module voltage of the module ($M_{x+1}$) having the greater pack node voltage causes controlled charge removal from the pack node $N_x$ associated with $M_x$ and redistribution of the removed charge to the pack node $N_{x+1}$ associated with $M_{x+1}$. However, an inequality wherein the module ($M_x$) with the lesser pack node voltage has a module voltage which is less than the module voltage of the module ($M_{x+1}$) having the greater pack node voltage does not cause any charge redistribution. With respect to any pair of modules corresponding to a converter means, module $M_x$ associated with node $N_x$ subject to controlled charge removal may be referred to as the source module, and module $M_{x+1}$ associated with node $N_{x+1}$ subject to controlled charge infusion may be referred to as the destination module. Since each of the converter means is of the same boost topology, any redistribution of charge is caused to occur in one direction along the string of modules—in other words charge is pumped up the string from a module having a lower pack node voltage to a module having a higher pack node voltage. It can therefore be seen that the charge redistribution is unidirectional with respect to both the pair of modules associated with an individual converter means and the series arrangement of modules. Module $M_1$ is the end module last in the series arrangement in the direction of charge redistribution and module $M_n$ is the end module first in the series arrangement in the direction of charge redistribution.

A major advantage to be appreciated is that charge redistribution does not merely shunt current around a module and thereby does not suffer from high energy losses through heat dissipation associated with such techniques. The converter means comprises switched mode converter circuitry thereby utilizing minimal resistive elements while relying on near lossless energy storing reactive elements for charge redistribution. All of this translates into a very efficient equalization apparatus which redistributes substantially all pumped charge within the system thereby dissipating minimal energy out of the system. A preferred switched mode converter means is described at a later point in conjunction with FIG. 4.

Still with reference to FIG. 1, end module $M_n$ is illustrated having converter means $C_n$ associated therewith. This is a preferred arrangement for the end module which is last in the series arrangement in the direction of charge redistribution, although not a necessity for carrying out the invention. Without converter means $C_n$, module $M_n$ may become overcharged since no means would exist for removing charge from pack node $N_n$. With the inclusion of converter means $C_n$ in the preferred arrangement, it is necessary to establish another reference voltage in addition to that of module voltage $VM_n$ for its operation. A reference voltage that simulates that of a module is provided by phantom module 14. Additionally, a destination for any charge current removed from pack node $N_n$ is also needed, which phantom module 14 also provides. Phantom module 14 may present a controlled voltage to converter means $C_n$ in accordance with a calibrated voltage or alternatively may present a controlled voltage in accordance with the average module voltage "$VM_{avg}$". Preferably, the latter referenced voltage scheme is utilized and the voltage presented to converter means $C_n$ is substantially the aggregate pack voltage divided by the number of modules VP/n which is equivalent to the average module voltage $VM_{avg}$.

Figure 5A:
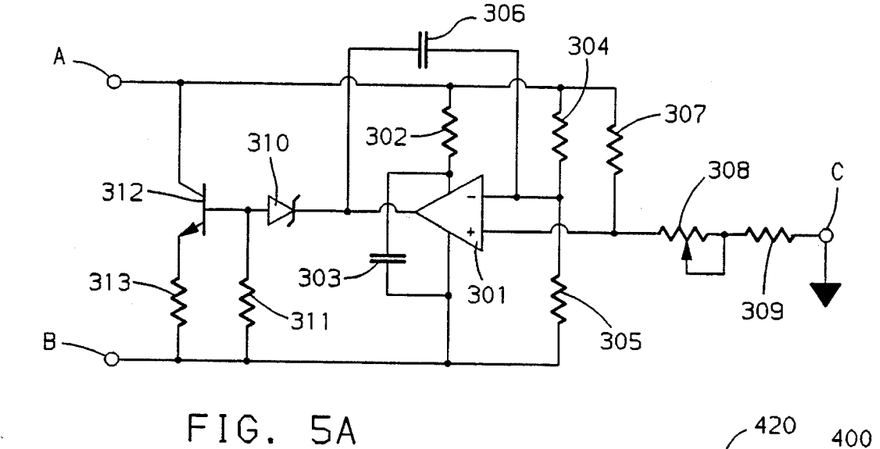
FIG. 5A is a schematic of one system phantom module for charge shunting as illustrated in FIG. 1.
Figure 5B:
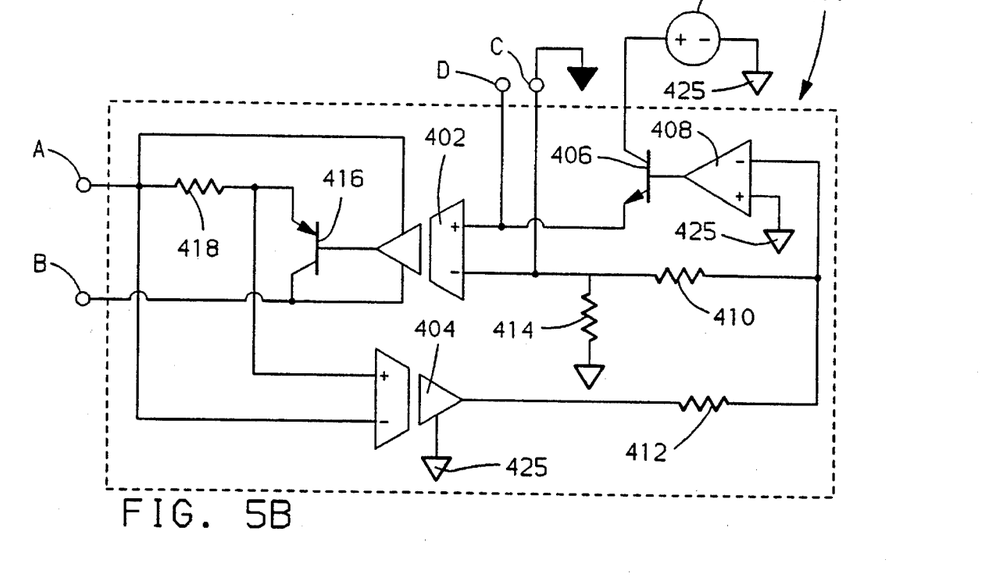
FIG. 5B is a schematic of an alternate system phantom module for charge redistribution as illustrated in FIG. 1.

Phantom module 14 is shown coupled to aggregate pack voltage VP (terminal 11) at phantom module terminal B, pack ground (terminal 10) at phantom module terminal C, and converter means $C_n$ terminal a at phantom module terminal A. In operation, any charge pumped up to terminal A of phantom module 14 is shunted therethrough to terminal B, the energy associated therewith being dissipated as heat. Alternatively, phantom module 14 can be configured such that the charge current pumped up thereto from pack node $N_n$ is redistributed within the system to the initial module $M_1$ at pack node $N_1$ as shown by dotted line 16 coupling phantom module 14 terminal D to pack node $N_1$. These two alternative embodiments of phantom module 14 will be exemplified with respect to specific circuitry as shown in FIGS. 5A and 5B.

Figure 4:
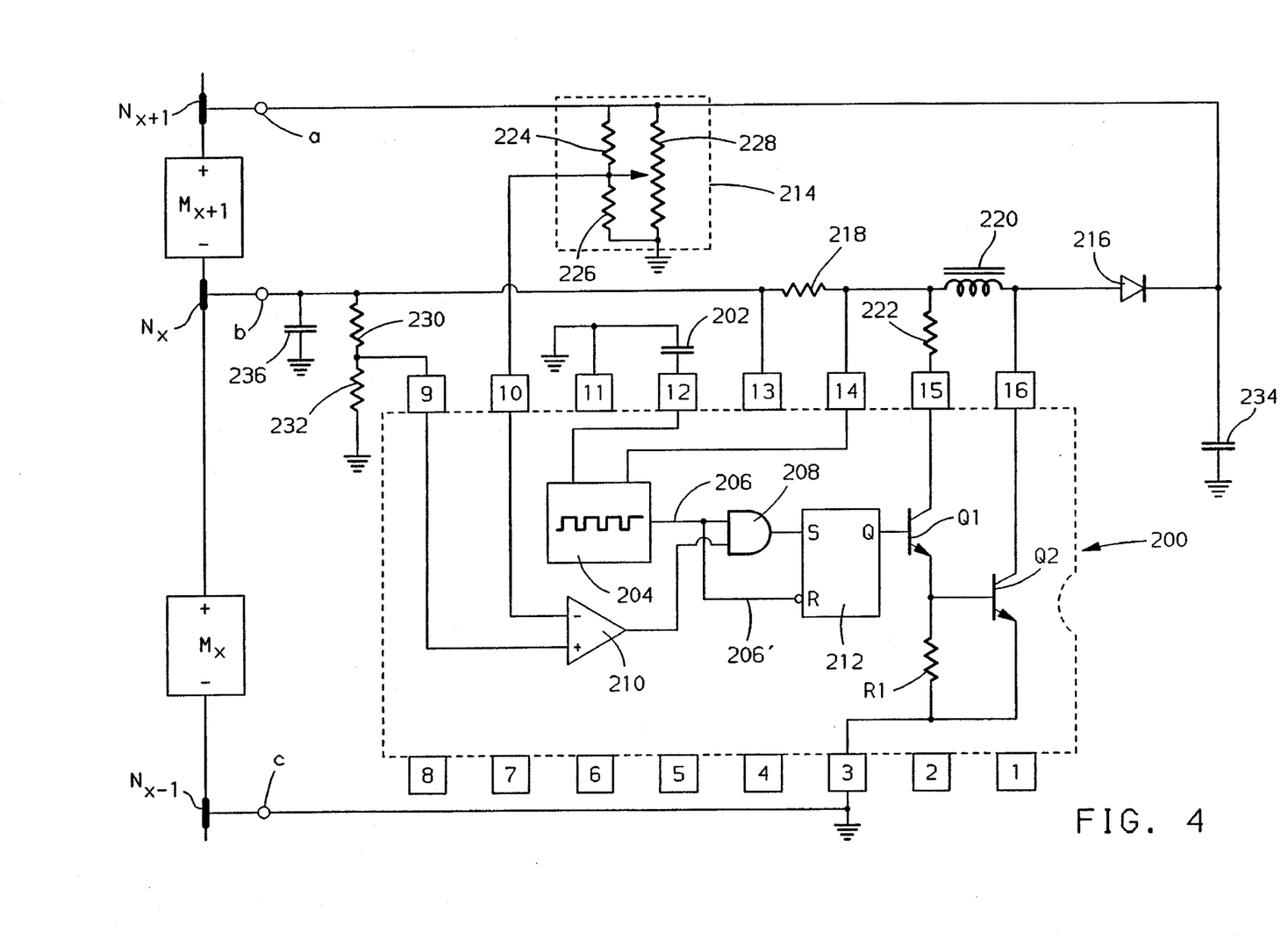
FIG. 4 is a schematic diagram of a preferred unidirectional boost converter as applied to a distributed charge equalization apparatus illustrated in FIG. 1A.

Referring now to FIG. 4, an exemplary boost converter topology circuit is illustrated for carrying out the present invention. The terminal designations of lower case a,b and c correspond to the same designations of the converters illustrated in the block diagram of FIG. 1. While the circuitry illustrated could be fabricated using discrete components, prefabricated monolithic semiconductor switching regulators available in convenient DIP pin packages are the preferred foundation for the embodiment described herein. Shown in FIG. 4 is one such 16 pin package, µA78S40, available commercially from Motorola, utilized in the present embodiment and hereinafter referred to as IC 200. An arbitrary pair of adjacent modules, $M_x$ and $M_{x+1}$, from a pack are also illustrated and labeled as are appropriate pack nodes, $N_{x+1}$, $N_{x \ and \ Nx+1}$. When the module voltage $VM_{x+1}$ coupled between terminals a and b exceeds the module voltage $VM_x$ coupled between terminal b and c, no charge transfer occurs from the pack node $N_x$ to the pack node $N_{x+1}$. However, where the module voltage $VM_x$ coupled between terminals b and c exceeds the module voltage $VM_{x+1}$ coupled between terminals a and b, charge transfer is caused to occur from the pack node $N_x$ to the pack node $N_{x+1}$.

The preferred configuration of FIG. 4 shows pins 3 and 9–16 only are utilized. Power for IC 200 is provided at pin 13 from terminal b which is also coupled to the common node $N_x$ between two adjacent modules as illustrated in FIG. 1. IC ground reference for IC 200 is provided at pin 11 from terminal c which is also coupled to the negative terminal (node $N_{x-1}$) of the module having the lesser pack node voltage at its positive terminal relative to the aggregate pack ground as illustrated in FIG. 1. Each of the plurality of IC ground references is therefore relative to the negative terminal of module $M_x$ and should not be confused with the aggregate pack ground.

External timing capacitor 202 is coupled between the IC ground reference and pin 12 to control the output period and duty cycle of free running oscillator 204. Timing capacitor is charged and discharged in accordance with the circuitry of oscillator 204 to yield an approximate output duty cycle ratio of 6:1 which may be reduced to provide over-current protection as discussed later. The oscillator output on line 206 is either a logical "1" or logical "0" input into two input AND gate 208. The other input to AND gate 208 is the output of comparator 210 on line 212. Comparator 210 has at its inverting input a voltage signal substantially representative of the midpoint voltage of the total voltage across series modules $M_x$ and $M_{x+1}$. The inverting input is coupled to the voltage signal through pin 10 which is itself coupled to voltage divider circuit 214 which establishes the midpoint voltage between terminals a and c. The non-inverting input of comparator 210 similarly is coupled to a voltage signal substantially representative of the voltage of the actual voltage at node $N_x$ via terminal b and c and resistors 230, 232. If the voltage of module $M_x$ is lower than the voltage of module $M_{x+1}$ then the actual node voltage at $N_x$ relative node $N_{x-1}$ will be lower or more negative than the midpoint voltage across the pair of adjacent modules.

Comparator 210 is operative to output a logical "1" where the module voltage of $M_{x+1}$ is less than the module voltage of $M_x$, and a logical "0" where the voltage of $M_{x+1}$ is greater than the voltage of $M_x$. A logical "1" at the output of comparator 210 indicates an inequality as between the two module voltages to which the unidirectional boost topology of the present embodiment is designed to address. The logical output of comparator 210 is gated with the logical output of oscillator 204 at AND gate 208. When both logical inputs to AND gate 208 are high, the output of the gate is likewise high and in turn sets the output "Q" of SR latch 212 high via set input "S" thereof. Reset input "R" of the latch receives an inverted oscillator output signal via line 206' and as a result, SR latch 212 once set high at output Q will remain set high for so long as the output of oscillator 204 remains high regardless of the logical level of comparator 210. Similarly, once reset low at output Q, SR latch 212 will remain reset at least for so long as comparator 210 output is logical "0". Output Q therefore essentially follows the logical state of oscillator 204 for so long as equalization is required as indicated by a high output from comparator 210.

The output Q from SR latch when set is a logical "1" which in turn will force transistors Q1 and Q2 into saturation. Diode 216 is thereby reverse biased and current begins to flow out of node $N_x$ through over-current resistor 218, inductor 220, transistor Q2 to node $N_{x-1}$, thereby energizing inductor 220 from module $M_x$. When the output Q from SR latch goes to a logical "0", transistors Q1 and Q2 are biased non-conductive resulting in a collapse of the magnetic field through inductor 220 and reversal of voltage thereacross. Inductor 220 thereby provides current into node $N_{x+1}$ through diode 216 for charge equalizing module $M_{x+1}$ with module $M_x$. Filter capacitor 234 provides output ripple reduction. This cycle of charge redistribution out of node $N_x$ and into node $N_{x+1}$ continues in accordance with the period of oscillator 204 for so long as module $M_{x+1}$ voltage is less than module $M_x$ voltage as indicated by the previously described logical "1" at the output of comparator 210.

Current limiting is one feature of the present embodiment provided through use of an appropriate over-current resistor 218 which, as previously mentioned, passes current contributing to the energization of inductor 220. The voltage drop across over-current resistor 218 is monitored at pin 14 which is coupled to overcurrent circuitry of oscillator 204. As the current through inductor 220 ramps up, the voltage drop across over-current resistor increases and if it reaches a critical value as predetermined by the overcurrent circuitry of oscillator 204 causes the sourcing of additional charge current to timing capacitor 202 thereby attenuating the oscillator duty cycle for the current period and limiting further sourcing of current through inductor 220. Collector resistor 222 is chosen to ensure operation of transistor Q1 in saturation. Resistor R1 is nominally 170 ohms as provided internal IC 200. Further details on operation of IC 200 and considerations for external component values may be found in the manufacturers data sheets. The following table lists exemplary external component values for a preferred operative boost converter means used in conjunction with a pair of conventional 12 volt automotive lead acid modules. It should be understood that it may be desirable to alter component values consistent with the objectives and ordinary skill of the designer without deviating from the scope of the invention.

| Component | Value |
| --- | --- |
| R 230 | 10 KΩ |
| R 232 | 10 KΩ |
| R 224 | 10 KΩ |
| R 226 | 3.3 KΩ |
| R 228 | 100 KΩ |
| R 218 | 0.22 Ω |
| R 222 | 36 Ω |
| C 236 | 470 µF |
| C 234 | 470 µF |
| C 202 | 680 pF |
| L 220 | 180 µH |

Referring now to FIG. 5A, a first circuit for a phantom module for use in a unidirectional boost converter topology charge equalization system as illustrated in FIG. 1 is shown. This particular phantom module is effective to present a controlled voltage to the converter means $C_n$ associated with the end module $M_n$ substantially equivalent to the aggregate pack voltage VP divided by the number of modules n. Charge current redistributed from node $N_n$ corresponding to the end module $M_n$ is shunted and the energy associated therewith is dissipated as heat in order to maintain charge equalization of the modules. In this embodiment, end module $M_n$ is the source module and the phantom module simulates a destination module providing both a simulated module voltage and a charge destination.

The circuit of FIG. 5A generally designated 300 is based around operational amplifier 301. Power and ground are supplied thereto via terminals A and B respectively. As illustrated in FIG. 1A, phantom module terminal A is coupled to converter means $C_n$ terminal a; phantom module terminal B is coupled to node $N_n$ and thereby to converter means $C_n$ terminal b; and, phantom module terminal C is coupled to pack ground. Power is coupled through resistor 302 and filter capacitor 303 is coupled between terminal B and resistor 302. Matched value resistors 304 and 305 divide the voltage across terminals A and B and couple it to the inverting input of operational amplifier 301. Capacitor 306 is coupled in negative feedback across the output and inverting input of amplifier 301. The non-inverting input of amplifier 301 is coupled to terminal A through resistor 307 and to terminal C through resistors 308 and 309. The output of amplifier 301 is coupled to the cathode of zener diode 310. The anode of zener diode 310 is coupled to terminal B through resistor 311 and to the base of NPN transistor 312. Transistor 312 is coupled to terminal A at its collector and to terminal B through resistor 313 at its emitter.

In operation, circuit 5A is basically a shunt voltage regulator. It regulates a voltage $V_{AB}$ across terminal A and B as some fraction of the voltage $V_{AC}$ across terminal A and C. The output stage uses zener diode 310 and resistor 311 to allow transistor 312 to cut off even though amplifier 301 may not achieve an output of zero volts. Resistor 313 removes some of the power dissipation from transistor 312 thereby allowing a smaller transistor and providing some overcurrent protection. Amplifier 301 uses power bypass filtering of resistor 302 and capacitor 303. Negative feedback capacitor 306 is used to slow the response down thereby stabilizing circuit operation. The voltage across terminals A and B is regulated when the voltage division provided by matched resistors 304 and 305 at the inverting input equals the voltage division provided by the resistive network 307, 308 and 309 across terminal A and C. The voltage $V_{AB}$ is equal to the module voltage $VM_n$ and the voltage $V_{BC}$ is equal to the aggregate pack voltage VP. This results in the voltage $V_{AC}$ across terminal A and C appearing like an aggregate voltage of n+1 modules ($V_{AC}=VP+VM_n$). The resistive network 307, 308 and 309 is chosen to establish a voltage ratio of 1 to 2*(n+1) at the noninverting input to the amplifier to force regulation of the voltage $V_{AB}$ to substantially an average module voltage [$VM_{avg}=V_{AC}/(n+1)=(VP+VM_n)/(n+1)$]. Values for resistors 307, 308 and 309 are listed below assuming an exemplary pack having five modules. Resistor 308 is, as illustrated, a variable resistor used to trim the or fine tune the network.

| Component | Value |
|---|---|
| R 302 | 10 Ω |
| R 304 | 100 KΩ |
| R 305 | 100 KΩ |
| R 307 | 100 KΩ |
| R 308 | 200 KΩ |
| R 309 | 4.75 KΩ |
| R 311 | 10 KΩ |
| R 313 | 10 Ω |
| C 303 | 0.1 μF |
| C 306 | 0.1 μF |

Referring to FIG. 5B, a second circuit for a phantom module for use in a unidirectional boost converter topology charge equalization system as illustrated in FIG. 1A is shown. This embodiment of a phantom module, however, closes the loop on the string of modules by (a) presenting module voltage $VM_1$ to converter $C_n$ for comparison to the module voltage $VM_n$, and (b) redistributing charge pumped thereto into node $N_1$ when $VM_1<VM_n$, thereby simulating adjacency of the two end modules $M_n$, $M_1$. Isolation circuitry is necessary to accomplish this type of charge redistribution from one module to another module not immediately adjacent thereto.

This redistributive phantom module designated 400 in FIG. 5B comprises a pair of isolation amplifiers 402 and 404. Terminals A, B, C and D correspond to like designations of the phantom module shown in FIG. 1A. Isolation amplifier 402 has its non-inverting terminal coupled to node $N_1$ corresponding to the positive terminal of the module $M_1$, and has its inverting terminal coupled to the pack ground, thereby presenting module voltage $VM_1$ thereacross. The non-inverting terminal of isolation amplifier 402 is also coupled to the emitter of NPN transistor 406. The collector of transistor 406 is coupled to power source 420. The base of transistor 406 is coupled to the output of operational amplifier 408. The non-inverting terminal of amplifier 408 is coupled to ground and the inverting terminal thereof is coupled to the inverting terminal of isolation amplifier 402 through resistor 410 and to the output of isolation amplifier 404 through resistor 412. Resistor 414 is shown coupled between terminal C and aggregate pack ground.

The output of isolation amplifier 402 is coupled to the base of PNP transistor 416. The collector of transistor 416 is coupled to node $N_n$ corresponding to the module $M_n$ and to the output reference of isolation amplifier 402. The emitter of transistor 416 is shown coupled to the non-inverting terminal of isolation amplifier 404 and to one side of resistor 418. The other side of resistor 418 is commonly coupled to the inverting terminal of isolation amplifier 404, the feedback of isolation amplifier 402 and terminal A of converter means $C_n$.

In operation, module voltage $VM_1$ between terminals C and D is translated to converter $C_n$ between terminals A and B via isolation amplifier 402 which uses PNP transistor 416 and limiting resistor 418 as a shunt voltage regulator. This is accomplished by using the feedback connection to the isolation operational amplifier in a manner to effect a voltage follower (i.e. the voltage between A and B follows the voltage between D and C). The current removed (or shunted) at terminal A (terminal a of converter $C_n$) is measured by resistor 418 and coupled to a current source connected to terminal D via isolation amplifier 404. The current source has a common 425 which is not that of the pack so it requires a floating power source 420. The current source is made with a pass transistor 406, error amplifier 408, current measuring shunt 414 and summing resistors 410, 412. Error amplifier 408 biases pass transistor 406 so that the voltage from current shunt 414 and the output voltage from isolation amplifier 404 are equal and opposite. This results in the current at terminal D being proportional to the command voltage at the output of isolation amplifier 404, which in turn is proportional to the current removed from terminal A. Exemplary component values are listed below.

| Component | Value |
|---|---|
| R 410 | 10 KΩ |
| R 412 | 10 KΩ |
| R 414 | 1 Ω |
| R 418 | 1 Ω |

Figure 2:
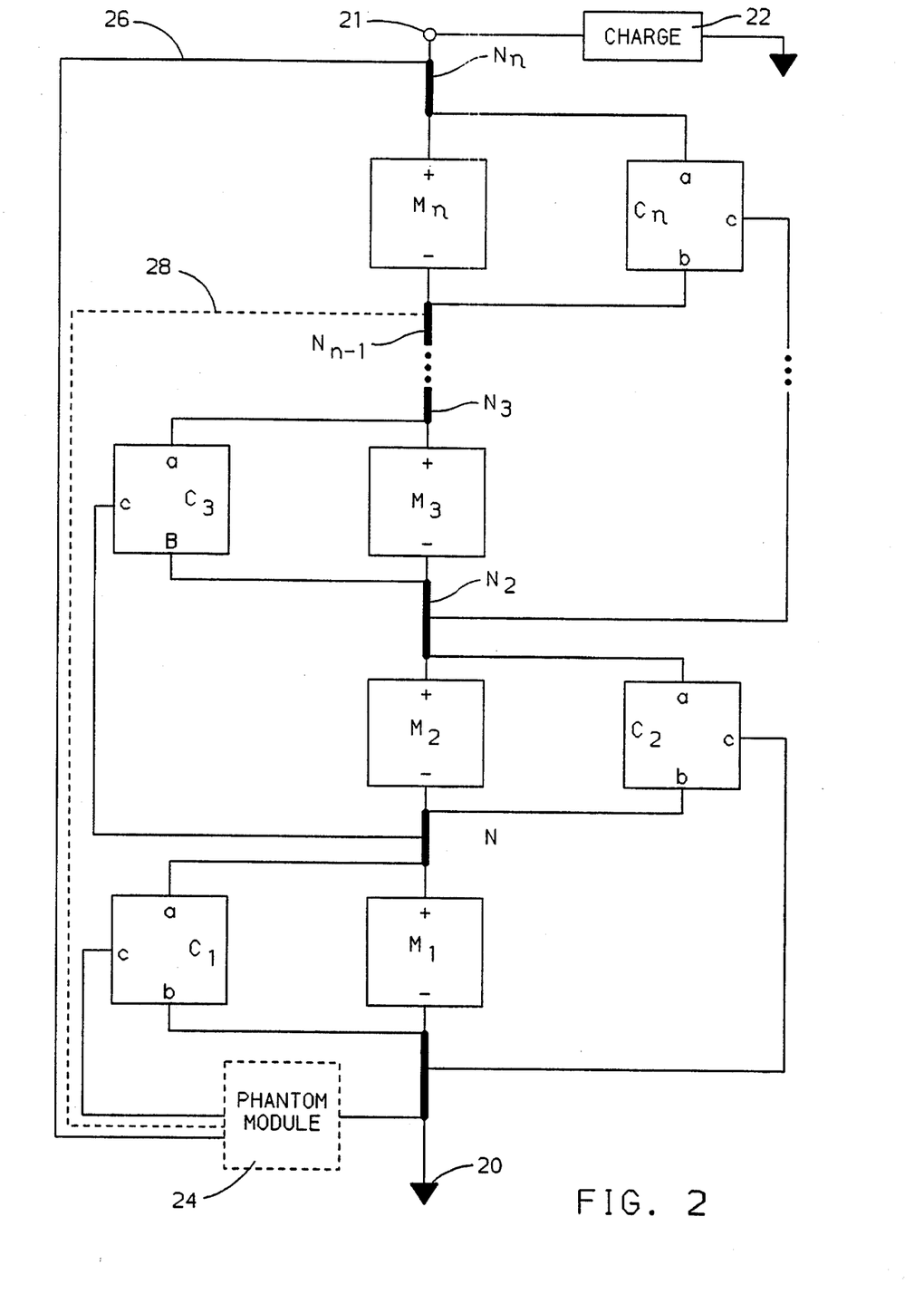
FIG. 2 is a block diagram illustrating a distributed charge equalization apparatus utilizing unidirectional buck converter topology in accordance with the present invention.
Figure 3:
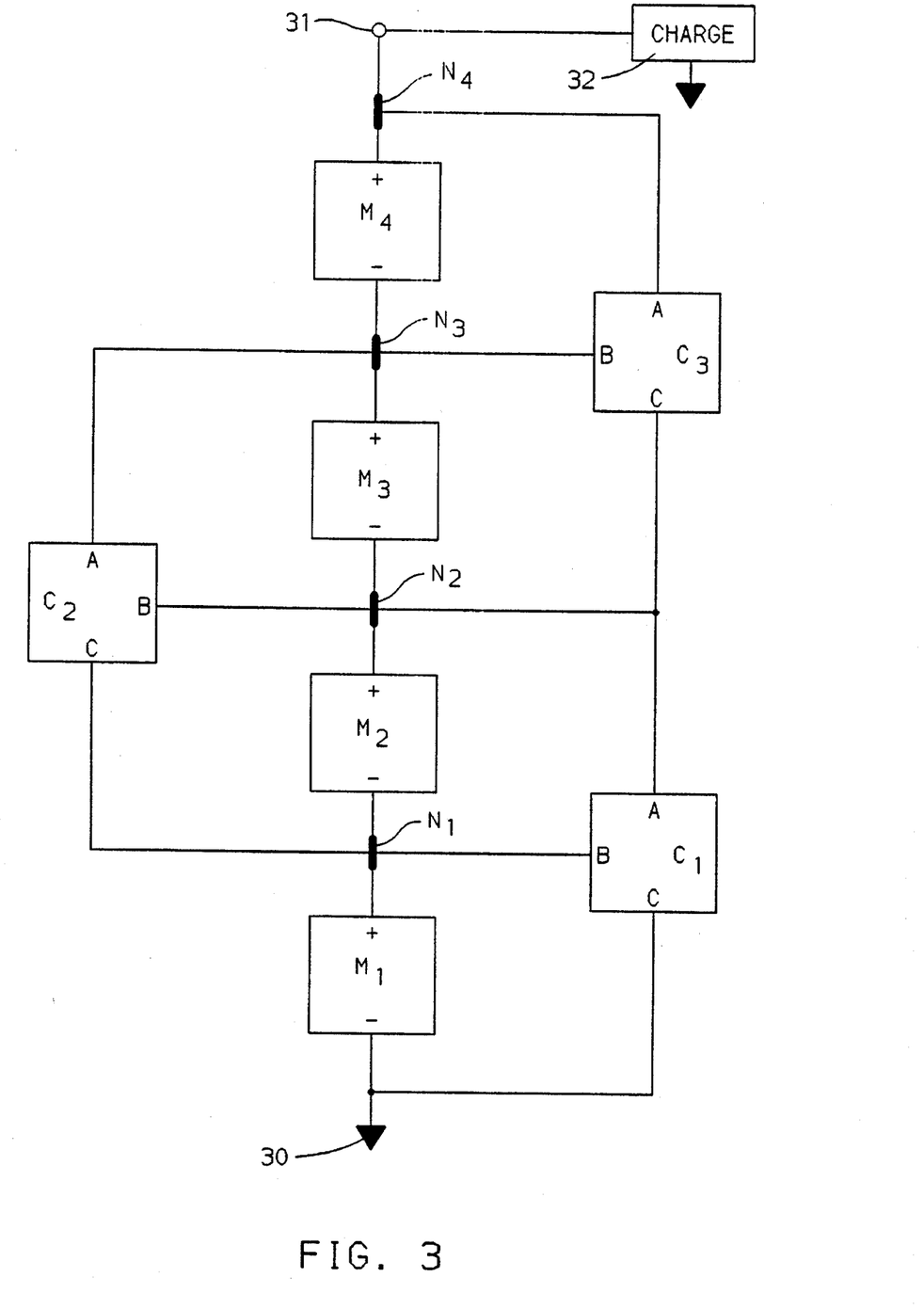
FIG. 3 is a block diagram illustrating a charge equalization apparatus utilizing bidirectional boost/buck converter topology in accordance with the present invention.

Embodiments of alternative unidirectional and bidirectional switched mode converter topologies for carrying forward the present invention are illustrated in block diagrams in FIGS. 2 and 3 respectively. With reference to FIG. 2, a multi-module pack comprises a plurality (n) of modules $M_x$ and associated nodes $N_x$ identified by numerical subscripts in the manner previously describing FIG. 1A. Charge source 22 is shown coupled between aggregate pack voltage terminal 21 and aggregate pack ground 20 for supplying DC charge current to the pack, preferably in a controlled manner as previously described.

In the embodiment illustrated in FIG. 2, charge redistribution is caused to occur in a unidirectional fashion substantially similar to that described in conjunction with FIG. 1. However, unidirectional buck converter topology is utilized in the present embodiment to remove charge from a pack node $N_x$ associated with a module $M_x$ and redistribute that charge to a pack node $N_{x-1}$ corresponding to a module $M_{x-1}$ at a lower aggregate pack voltage. In this arrangement as illustrated, terminal b of a converter means comprises the EQ lead for pumping charge into the pack node between a pair of adjacent modules. With respect to any pair of modules corresponding to a converter means, module $M_x$ associated with node $N_x$ subject to controlled charge removal may be referred to as the source module, and module $M_{x-1}$ associated with node $N_{x-1}$ subject to controlled charge infusion may be referred to as the destination module. Since each of the converter means is of the same buck topology, any redistribution of charge is caused to occur in one direction along the string of modules—in this embodiment charge is pumped down the string from a module having a higher pack node voltage to a module having a lower pack node voltage. It can therefore be seen that the charge redistribution is unidirectional with respect to both the pair of modules associated with an individual converter means and the series arrangement of modules. Module $M_n$ is the end module first in the series arrangement in the direction of charge redistribution and module $M_1$ is the end module last in the series arrangement in the direction of charge redistribution.

Like the unidirectional boost topology previously discussed with reference to FIG. 1, it is desirable to have a converter means $C_1$ associated with the end module last in the series arrangement in the direction of charge redistribution, although not absolutely necessary to carry out the invention. Without converter means $C_1$, module $M_1$ may become overcharged since no means would exist for removing charge from pack node $N_1$. Analogous to phantom module 14 in the FIG. 1 illustration of unidirectional boost topology, phantom module 24 in FIG. 2 provides means for presenting a reference voltage to converter means $C_1$ which simulates that of a charge equalized module. Preferably, this reference voltage is substantially equal to the average module voltage, for example, the aggregate pack voltage divided by the number of modules. Also, phantom module 24 provides a destination for charge current removed from node $N_1$. Charge current may be shunted and dissipated as heat out of the system or redistributed to module $M_n$ as illustrated by line 26 coupling phantom module to node $N_n$ thereby retaining energy within the system. If the charge is redistributed to Node $N_n$, then phantom module must be coupled also to node $N_{n-1}$ as shown by dashed line 28 in order to provide a comparison between module voltages $VM_n$ and $VM_1$. Otherwise, line 28 is not required to shunt the charge and dissipate the corresponding energy as heat.

Another embodiment of the present charge equalization invention is illustrated in block diagram FIG. 3. This figure features a multi-module pack comprised of four modules $M_1$ through $M_4$ to simplify the illustration; however, as with the other embodiments, any number of modules may be employed. Modules and associated nodes are therefore identified by definite numerical subscripts. Charge source 32 is shown coupled between aggregate pack voltage terminal 31 and aggregate pack ground 30 for supplying DC charge current to the pack, preferably in a controlled manner as previously described.

This embodiment, in contrast to those of previous description, utilizes bidirectional boost/buck topology converters for carrying out charge pumping from either module in a pair of modules to the other module in the pair. Therefore, each module is both a source and destination module with respect to a commonly coupled converter means. An advantage of the bidirectional arrangement is that the number of converters required is one less than either of the two preferred unidirectional arrangements. Additionally, a phantom module is wholly superfluous since all converter means are capable of both removing and contributing charge to any pack node. However, bidirectional converter means tend to be more complicated from a hardware and control standpoint, and further do not have the grouping or packaging advantages of either of the unidirectional arrangements.

While the invention has been exemplified with respect to certain preferred embodiments as disclosed herein, it is contemplated that various modifications and alterations will be apparent to one having ordinary skill in the art and therefore the embodiments are intended to be taken by way of example and not limitation. Accordingly, the invention is intended to embrace all alternatives, modifications and variations which are within the scope of the appended claims.

The embodiments of the invention in which an exclusive property or privilege is claimed are defined as follows:

1. In a rechargeable electrochemical battery system having a battery pack comprising a series arrangement of electrochemical modules including end modules at opposite ends of the series arrangement, each of said modules having a positive and a negative terminal and a respective module voltage thereacross, said battery pack having an aggregate pack voltage terminal comprising the positive terminal of the one of the end modules with its respective negative terminal connected to an adjacent module and an aggregate pack ground terminal comprising the negative terminal of the other of the end modules with its positive terminal connected to an adjacent module, each module further having a corresponding pack node voltage across its respective positive terminal and the aggregate pack ground terminal, a module charge equalization apparatus comprising:

a charging source coupled across the aggregate pack voltage terminal and aggregate pack ground terminal; and, a plurality of switched mode power converter means, each converter means coupled to a respective pair of said modules which are adjacent one another such that all pairs of adjacent modules have associated therewith one of the plurality of converter means, each of said converter means being responsive to the module voltages of the respective pair of adjacent modules coupled thereto to bidirectionally pump charge from the positive terminal of the one of said respective pair of adjacent modules which has a greater module voltage to the positive terminal of the other of said respective pair of adjacent modules which has a lesser module voltage.

2. In a rechargeable electrochemical battery system having a battery pack comprising a series arrangement of electrochemical modules including end modules at opposite ends of the series arrangement, each of said modules having a positive and a negative terminal and a respective module voltage thereacross, said battery pack having an aggregate pack voltage terminal comprising the positive terminal of the one of the end modules with its respective negative terminal connected to an adjacent module and an aggregate pack ground terminal comprising the negative terminal of the other of the end modules with its positive terminal connected to an adjacent module, each module further having a corresponding pack node voltage across its respective positive terminal and the aggregate pack ground terminal, a module charge equalization apparatus comprising:

a charging source coupled across the aggregate pack voltage terminal and aggregate pack ground terminal; and, a plurality of switched mode power converter means, each converter means coupled to a respective pair of said modules which are adjacent one another such that all pairs of adjacent modules have associated therewith one of the plurality of converter means, each of said converter means being responsive to the module voltages of the respective pair of adjacent modules coupled thereto to unidirectionally pump charge from the positive terminal of a first one of said respective pair of adjacent modules to the positive terminal of a second one of said respective pair of adjacent modules only when the module voltage of the first one of said pair of adjacent modules exceeds the module voltage of the second one of said pair of adjacent modules, the respective first and second ones of all pairs of adjacent modules having the same relative positions within the series arrangement.

3. A module charge equalization apparatus as claimed in claim 2 further comprising:

a simulated pair of adjacent modules comprising the one of the end modules last in the series arrangement in the direction of charge pump and a simulated module having a positive and a negative terminal and a simulated module voltage thereacross, an additional converter means coupled to the simulated pair of adjacent modules and responsive to the module voltage and the simulated module voltage of the simulated pair of adjacent modules coupled thereto to unidirectionallly pump charge from the positive terminal of the one of the end modules last in the series arrangement in the direction of charge pump to the positive terminal of the simulated module only when the module voltage of the one of the end modules last in the series arrangement in the direction of charge pump exceeds the simulated module voltage of the simulated module.

4. A module charge equalization apparatus as claimed in claim 3 herein said simulated module shunts the charge pumped thereto to thereby dissipate the energy associated therewith.

5. A module charge equalization apparatus as claimed in claim 4 wherein said simulated module redistributes the charge pumped thereto to the positive terminal of the other of the end modules.

6. A module charge equalization apparatus as claimed in claim 2 wherein the first one of said pair of adjacent modules comprises the one module of said pair of adjacent modules having a greater pack node voltage than the other module of said pair of adjacent modules.

7. A module charge equalization apparatus as claimed in claim 2 wherein the first one of said pair of adjacent modules comprises the one module of said pair of adjacent modules having a lesser pack node voltage than the other module of said pair of adjacent modules.

* * * * *